(No Model.)  2 Sheets—Sheet 1.
T. B. ATTERBURY.
MANUFACTURE OF GLASS SHADE HOLDERS.
No. 313,399. Patented Mar. 3, 1885.

WITNESSES

INVENTOR (No Model.) 2 Sheets—Sheet 2.

T. B. ATTERBURY.
MANUFACTURE OF GLASS SHADE HOLDERS.

No. 313,399. Patented Mar. 3, 1885.

WITNESSES
W. S. Pinsabaugh
C. L. Emmons.

INVENTOR
T. B. Atterbury
By his Attorney
S. W. Pinsabaugh

UNITED STATES PATENT OFFICE.

THOMAS B. ATTERBURY, OF PITTSBURG, PENNSYLVANIA.

MANUFACTURE OF GLASS SHADE-HOLDERS.

SPECIFICATION forming part of Letters Patent No. 313,399, dated March 3, 1885.

Application filed January 2, 1885. (No model.)

*To all whom it may concern:*

Be it known that I, THOMAS B. ATTERBURY, a citizen of the United States, residing at Pittsburg, in the county of Allegheny and State of Pennsylvania, have invented certain new and useful Improvements in the Manufacture of Glass Shade-Holders, of which the following is a specification, reference being had therein to the accompanying drawings.

My invention relates to improvements in glass lamp-shade holders and in the manufacture of the same.

The object of my invention is to provide a cheap and reliable holder for lamp-shades which will admit of the free passage of light, and at the same time hold the shade in a safe and reliable manner.

My invention consists, essentially, of a shade-holder without a shank, the base of the holder being adapted to fit the base of the burner, and provided with suitable openings or indentations to admit of the passage of the prongs or springs of the burner to go inside of the shade.

Figure 1:
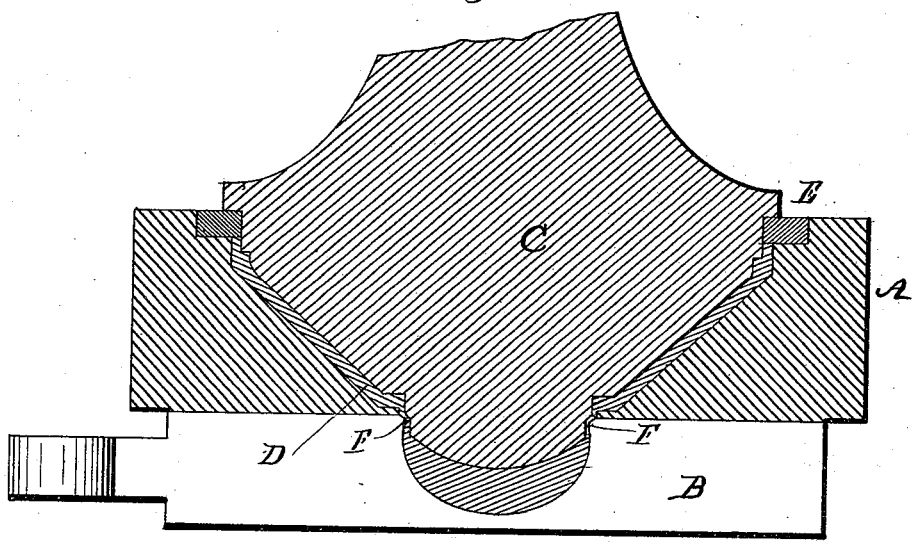
Figure 2:
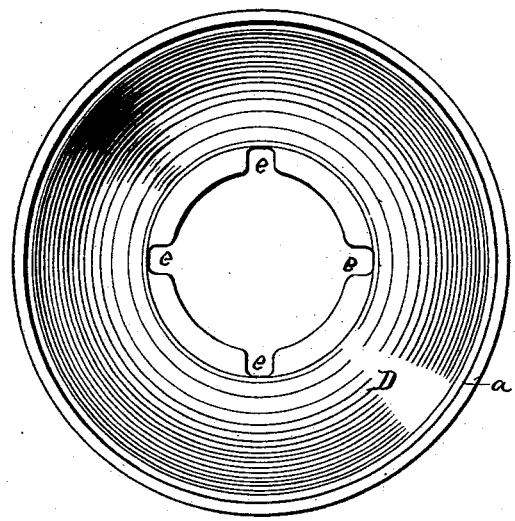
Figure 3:
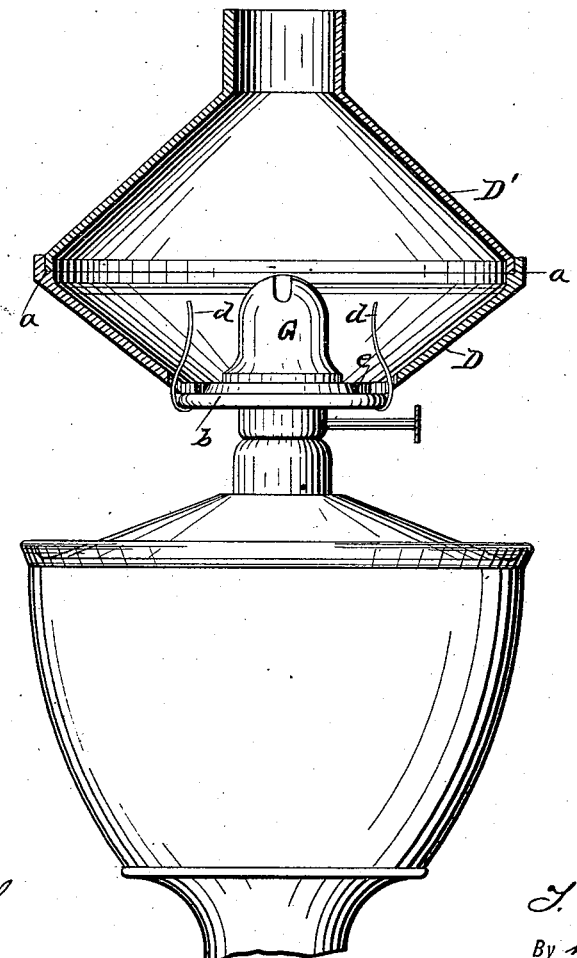

Referring to the drawings, Figure 1 is a sectional view of a mold and plunger with the shade-holder therein as formed under pressure. Fig. 2 is a top or plan view of my improved shade-holder. Fig. 3 is a view, partly in section, of my device as applied to an ordinary lamp-burner.

Shade-holders as heretofore made have been provided with a somewhat lengthened shank adapted to fit the burner much in the same manner as the ordinary chimney; but this form of construction is objectionable, for the reason that the flaring portion of the holder is thrown so high that the best effect of the light is not given out. The light shining, as it does, through a somewhat contracted cylinder the full refracting power of the large portion of the shade-holder is not utilized. Another objection to the shanked holder is that they are much more difficult to make and require more glass in their construction than is necessary.

My present invention relates more particularly to improvements on shade-holders for which Letters Patent were granted to J. S. and T. B. Atterbury, December 16, 1873, No. 145,548, in which the shade-holder is adapted to fit around the central cavity of the lamp and be supported by the top of the lamp-bowl.

In Fig. 1 I show a solid mold-section, A, and a hinged section, B, with plunger C and shade-holder D therein, E being the ordinary ring used in pressing glass articles. The section of the mold-bottom B (only one being shown) is provided with a knife-edge or V-shaped projection, F, which projects inward, so as to form a thin place in the article, which can be readily broken off at that point and ground down in the usual manner to form a level base.

As heretofore indicated, D is the shade-holder, which is conical in general configuration, and is provided at its upper inner portion with a ledge, $a$, on which the shade proper, D', is supported. The lower portion or apex of the holder D is flat and adapted to rest on the flange $b$ of the burner G, said burner being of the ordinary or any other construction adapted for the purpose. I have shown, however, an ordinary burner provided with the usual prongs or springs, $d$, for holding a chimney; but it must be understood that by the use of the shade-holder the ordinary chimney is dispensed with, although they can be used with my form of shade-holder without making any further change in the burner.

The sides of the lower opening of the shade-holder are provided with openings or indentations $e$, which allow the upright prongs or springs $d$ to go inside of the shade-holder, and permits the shade to rest on the base $b$ of the burner G, while the prongs or springs $d$ serve to steady and retain the shade-holder in its proper place or position on the ledge or base. The indentations can be made in the holder while the same is being pressed in the molds by any suitable means; or they can be made by reheating the holder after the top portion has been removed and placing it over a former having four or any desired number of ribs, which will make the proper indentations; or they can be cut out by means of a suitable tool while the holder is still in a heated condition, all of which methods will readily suggest themselves to those skilled in the art of working glass.

Several advantages can be claimed for this shade-holder over all others in the market. By dispensing with the shank it allows the burner to extend farther up into the shade-holder, thus giving a much better light. It can be made much cheaper than those having a "shank," as it does not require as much glass to make it; nor does it require so much pressure. The workmen can make more of them at a "burn" or "shop," and they can be made much thinner, thereby giving a much clearer and better light than the thick ones.

Having thus described my invention, what I claim, and desire to secure by Letters Patent, is—

1. A shade-holder without a shank, the base of said holder being provided with a flat surface to rest on the base of the burner, as set forth.

2. A shade-holder of the character described, having a flat surface to rest on the base of the burner and provided with suitable openings or indentations, $e$, to permit the prongs or springs of the burner to pass inside of the shade-holder and hold the same in position on the lamp, as set forth.

3. A shade-holder provided with a flat base and openings or indentations $e$, in combination with the burner G, having the ledge $b$ and prongs $d$ or other suitable devices for retaining the shade-holder in position, as set forth.

4. A shade-holder adapted to rest on and be supported by the burner of the lamp, said burner being provided with springs to hold and retain the chimney of the lamp, whereby the shade-holder can be used with or without a chimney, as set forth.

In testimony whereof I affix my signature in presence of two witnesses.

THOMAS B. ATTERBURY.

Witnesses:
D. P. BERG,
H. J. WENKE.